United States Patent [19]
Champagne et al.

[11] Patent Number: 5,209,940
[45] Date of Patent: May 11, 1993

[54] STABILIZING UNMILLED BROWN RICE BY ETHANOL VAPORS

[75] Inventors: Elaine T. Champagne, Mandeville; Robert J. Hron, Sr., New Orleans; George Abraham, Metairie, all of La.

[73] Assignee: The United States of America as represented by the Secretary of Agriculture, Washington, D.C.

[21] Appl. No.: 694,964

[22] Filed: May 2, 1991

Related U.S. Application Data

[63] Continuation-in-part of Ser. No. 557,822, Jul. 26, 1990.

[51] Int. Cl.$^5$ .......................... A23B 9/18; A23B 9/26
[52] U.S. Cl. .................................. 426/320; 426/331; 426/430; 426/483; 426/622; 568/913
[58] Field of Search ............. 426/622, 430, 483, 320, 426/331; 260/412.2

[56] References Cited

U.S. PATENT DOCUMENTS

| | | |
|---|---|---|
| 2,538,007 | 1/1951 | Kester ..................... 99/153 |
| 2,585,978 | 2/1952 | Van Atta et al. ................ 99/153 |
| 2,745,748 | 5/1956 | McCashen ................ 426/622 |
| 2,829,055 | 4/1958 | Ozai-Durrani . |
| 2,992,921 | 7/1961 | Bardet et al. . |
| 3,086,867 | 0/1963 | Miller ........................ 99/80 |
| 3,172,766 | 3/1965 | Larebeyrette ............... 426/622 |
| 3,261,690 | 7/1966 | Wayne ...................... 99/80 |
| 3,330,666 | 7/1967 | Wayne ...................... 99/80 |
| 3,421,902 | 1/1969 | Wayne ...................... 426/430 |
| 3,492,326 | 1/1970 | Barnett et al. .............. 260/412.4 |
| 3,714,719 | 2/1973 | Wayne ...................... 34/74 |
| 3,959,515 | 5/1976 | McCabe ...................... 426/627 |
| 4,486,353 | 12/1984 | Matsuzaki et al. ............ 426/430 |
| 4,582,713 | 4/1986 | Hirokawa et al. ............ 426/233 |
| 4,921,718 | 5/1990 | Ohtsu ........................ 426/618 |

OTHER PUBLICATIONS

Kahlon et al., "Influence of rice, oat and wheat bran . . . " Abstract FASEB, Mar. 1989.
M. Hegsted, Abstract, 1990.
Mitsuda et al., "Underwater and underground storage of cereal grain" Food Tech. 26:50–56.
Sowbhagya, C. M. et al., 1976, "Lipid autoxidation in rice", J. Food Sci. 41:1018–1023.
Ory, R. L. et al., 1980, "Storage quality of brown rice as affected by packaging with and without carbon dioxide", J. Food Prot 43:929–932.
Sharp, R. N. et al., 1986, "Effects of storage time, storage temperature, and . . . ", Cereal Chem 63:247–251.
Cheigh et al., "On the Oxidation of rice lipid fractions extracted . . . " Korean J. Food Sci. Technol. vol. 4, No. 3 (1972) pp. 206–212.
Cheigh et al., "Effects of solvent extraction by immersion on . . . " Korean J. Food Sci. Technol. vol. 4, No. 4 (1972).
"Solvent extractive rice milling" in *Rice Chemistry and Tech.* D. F. Houston, Ed., Am. Assoc. of Cereal Chem., St. Paul, Minn.
DeLucca, A. J. et al., 1978, "Isolation and identification of lipolytic microorganisms . . . ", J. Food Protection 41:28–30.
Talwalkar, R. T. et al., 1965, "rice bran—a source material for pharmaecuticals", J. Food Sci. Technol., 2:117–119.

(List continued on next page.)

Primary Examiner—Jeanette Hunter
Assistant Examiner—Mary S. Mims
Attorney, Agent, or Firm—M. Howard Silverstein; John D. Fado; Joseph A. Lipovsky

[57] ABSTRACT

The present invention relates to stabilizing unmilled or partially milled brown rice by contact thereof with ethanol vapors. The present invention also encompasses products of said stabilizing including, stabilized unmilled or partially milled brown rice, and partially stabilized flour produced by grinding of said stabilized unmilled or partially milled brown rice.

20 Claims, 5 Drawing Sheets

OTHER PUBLICATIONS

Shastry, B. S. et al., 1971, "Studies on rice bran lipase", Ind. J. Biochem. Biphys. 8:327–332.

Koch, R. B., 1961, "Dehydrated foods and model systems", p. 230 in: Symposium on Foods: Lipids and their oxidation, H. W. Schultz ed., The Avi Publishing Co., Inc., Wesport, Conn.

Enochian, R. V. et al., 1981, "Stabilization of rice bran with extruder cookers and recovery of edible oil...", U.S. Dept. of Agriculture Marketing Research Report 1120.

Hoffpavir, C. L. et al., 1947, "Germination and free fatty acids in ind. Cottonseeds", *Science,* 106:344–345.

Frankel, E. N., 1961, "Hydroperoxides", p. 51 in: Symposium on Foods: Lipids and their oxidation, H. W. Schultz, ed., The Avi Publishing Co., Inc., Westport, Conn.

STABILIZING UNMILLED BROWN RICE BY ETHANOL VAPORS

CROSS-REFERENCE TO RELATED APPLICATION

This instant application is a continuation-in-part of patent application Ser. No. 07/557,822 filed Jul. 26, 1990, entitled "Stabilizing Unmilled Brown Rice by Ethanol Extraction" by Elaine T. Champagne, Robert J. Hron, Sr., and George Abraham, which is incorporated herein by reference.

FIELD OF THE INVENTION

The present invention relates to: a process for stabilizing unmilled brown rice using ethanol vapors, and; stabilized unmilled brown rice (and brown rice flours produced therefrom) produced by the aforementioned process.

BACKGROUND AND SUMMARY OF THE INVENTION

Brown rice has a short shelf life (approximately 3-6 months) because of hydrolytic and oxidative deterioration of bran lipids. Brown rice lipids are readily hydrolyzed by lipases, both natural to the bran and of microbial origin, that release free fatty acids. Free fatty acids are the precursors of off-flavors and off-odors associated with lipid degradation products generated in subsequent oxidation reactions.

The susceptibility of brown rice to readily becoming rancid has limited the marketing of the kernels, flours, bran, and oil. Bran high in free fatty acids loses its animal feed and food value. At the elevated temperatures experienced during the transport of brown rice from the U.S. to other countries, the oil in the bran is subject to lipolytic hydrolysis. The higher the free fatty acids in the oil the more uneconomical it is to refine. The losses for potentially edible oil during refining are two to three times the free fatty acid content of the oil (Enochian et al, 1981, "Stabilization of rice bran with extruder cookers . . .", A preliminary analysis of operational and financial feasibility, U.S. Department of Agriculture Marketing Res. Report 1120).

Three approaches have been taken to stabilize brown rice to hydrolysis by lipases: 1) inactivating lipase by subjecting raw or brown rice to moist or dry heat (U.S. Pat. No. 2,585,978 to Van Atta et al, 1952; U.S. Pat. No. 2,992,921 to Bardet et al, 1961; U.S. Pat. No. 4,582,713 to Hirokawa et al, 1986) or to parboiling or precooking processes (U.S. Pat. No. 3,086,867 to Miller, 1963; U.S. Pat. No. 3,959,515 to McCabe, 1976; Sowbhagya and Bhattacharya, 1976, "Lipid autoxidation in rice" J. Food Sci. 41:1018-1023), 2) removing kernel oil which serves as a substrate for lipase by organic solvent extraction [U.S. Pat. No. 2,538,007 to Kester, 1951; U.S. Pat. No. 3,261,690 to Wayne, 1966 (as discussed more fully in "Solvent Extractive Rice Milling" in *Rice Chemistry and Technology*, D. F. Houston, Editor, Am. Assoc. of Cereal Chemists, St. Paul, Minn.)], and 3) denaturation of lipases, both natural to the bran and of microbial origin, by ethanol extraction, (U.S. patent application Ser. No. 07/557,822 to Champagne et al, 1990). The aforementioned Champagne et al patent application teaches stabilizing brown rice by contacting unmilled brown rice with liquid ethanol.

The present invention is drawn to a highly advantageous and unobvious process for stabilizing unmilled brown rice to lipolytic hydrolysis comprising: contacting unmilled or partially unmilled brown rice with ethanol vapor (i.e. the phrase "ethanol vapor" encompasses either vapor of pure 100% absolute ethanol, or vapor of aqueous mixtures including ethanol) under conditions providing no substantial loss of oil from the unmilled or partially milled brown rice by the ethanol vapor, thereby producing stabilized unmilled or partially milled brown rice and ethanol having rice extracts therein; and separating the stabilized unmilled or partially milled brown rice from the ethanol having rice extracts therein.

Other aspects of the present invention include production by the aforementioned process, of stabilized unmilled brown rice and partially stabilized unmilled brown rice flour having highly advantageous and unobvious properties; e.g. not susceptible to hydrolytic deterioration by lipase, improved storage stability, absence of solvent(s) not generally regarded as safe, having ungelatinized starch as a raw product, having very low bacterial and fungal populations, desirable kernel surface appearance, highly desirable cooking properties, no or minimal loss of oil, minerals, thiamine, protein, dietary fiber and carbohydrates, etc.

Other objects and advantages of the present invention will become readily apparent from the ensuing description.

DESCRIPTION OF THE PREFERRED EMBODIMENTS

The term ethanol is utilized in the accompanying specification and claims, in its well established art accepted meaning (see e.g. *The Condensed Chemical Dictionary*, 10th Ed., G. Hawley, ed., 1981, page 423) to include either: (1) pure 100% absolute ethanol (dehydrated); or (2) aqueous mixtures including ethanol, such as food (U.S.P.) grade which consists essentially of about 95% by volume ethanol and about 5% by volume water.

The contacting employed in the present invention may include either continuous or batch contacting of ethanol vapor with the unmilled or partially milled brown rice. In continuous contacting, the unmilled or partially milled brown rice may be moved through conventional equipment either counter-current, co-current, or cross-current to the flow of ethanol vapor. In batch contacting, either fresh-pure ethanol vapor or ethanol vapor from previous treatments (i.e. ethanol vapor is contacted with a first batch of unmilled or partially milled brown rice, separated therefrom, and subsequently contacted with at least one additional batch of unmilled or partially milled brown rice), may be used.

It is preferred that the contacting of the present invention be carried out at temperatures at or above the condensation point of ethanol vapor (78° for 95% v/v ethanol at atmospheric pressure). A preferred temperature range for carrying out the contacting at atmospheric pressure or above is from about 78° C. to about 100° C. depending upon the concentration of ethanol used (100% to 1%, v/v). Pressure and temperature ranges used vary directly with ethanol concentration used and the accompanying condensation temperature of its vapors. Super-heated ethanol vapor may be used but may result in starch gelatinization. A variety of pressures may be utilized in practicing the instant application: i.e. below atmospheric pressure, at atmospheric pressure, or above atmospheric pressure. When subatmospheric pressure (i.e. pressure below atmospheric) is utilized, the preferred temperature range is from about 15° C. to about 100° C. It is preferred to carry out the contacting of rice and ethanol vapor in an atmosphere which is saturated with ethanol vapor, in order to promote thorough contacting of the rice with the vapor.

Typically unmilled brown rice has about 12–13% moisture (moisture that rough rice is typically dried to after harvest). Rice having such typical moisture content or drier rice may be vapor-treated in accordance with the present invention. Prior to ethanol vapor treatment, it is preferred to: 1) reduce the moisture (i.e. water content) of the rice to a level where it is essentially in equilibrium with the water content of the ethanol vapor (i.e. this step may be utilized so that the ethanol vapor will not absorb water from the rice and the rice will not absorb water from the ethanol vapor); and 2) raise and maintain the temperature of the kernels at or above the condensation temperature of the ethanol vapor. This will prevent condensation of ethanol on the kernels, and no moisture, oil or bran components will be lost. Condensation of ethanol on the kernels is not desirable since a small amount of kernel oil ($<3\%$) and possibly some other bran components will be extracted. Also a water content equilibrium between the ethanol vapor and the rice may be achieved by: prior to the step of contacting, measuring the water content of the rice; and selecting and utilizing in said step of contacting, ethanol vapor having a water content which is essentially in equilibrium with the measured water content of the rice. Anhydrous ethanol vapors are not preferred since they will readily absorb water from the rice kernels and condense.

When the contacting is carried out using operating conditions under which the ethanol does not condense (or appreciably condense), the separating of rice and ethanol will involve separating rice from ethanol which consists of vapor, or consists essentially of vapor. When the contacting is carried out using operating conditions under which the ethanol partially condenses, the separating of rice and ethanol will involve, separating the stabilized rice from condensed ethanol which may contain rice extracts (some oil and other bran components) and from ethanol vapor and evaporating condensed residual liquid ethanol from the stabilized rice.

Subsequent to the separation, rice stabilized in accordance with the present invention may be ground to flour using conventional grinding equipment and methods. The present invention also encompasses such a step of grinding unmilled or partially milled brown rice which has been stabilized in accordance with the instant invention, as well as flour produced thereby.

The instant invention also encompasses a step of separating the rice extracts from the ethanol having rice extracts therein, so that the ethanol may be reused for further extraction. The rice extracts may be separated from the ethanol using conventional separations such as distillation, filtration, centrifugation, adsorption, ion exchange or membrane separation. In a continuous process employing such separation and ethanol recycle, ethanol will need to be added to the process because a small amount of ethanol will leave the process as residue on the rice. In accordance with the present invention the stabilized unmilled brown rice may have a residual ethanol content of up to about 200 parts per million by weight.

The present invention produces stabilized unmilled or partially milled brown rice, not susceptible to enzymatic deterioration by lipase, not having gelatinized starch and having essentially full oil content, produced by the processes as described hereinabove. It is preferred that the contacting provides extraction of about 5% or less of brown rice oil from the unmilled or partially milled brown rice so as to retain its full nutritional value.

The following examples are intended only to further illustrate the invention and are not intended to limit the scope of the invention as defined by the claims:

EXAMPLES

Rough rice samples of Tebonnet (1989 crop) were obtained from the Louisiana State University Rice Experiment Station, Crowley, La. The samples were dehulled in a McGill Sheller (H. T. McGill, Houston, Tex.).

Figure 1:
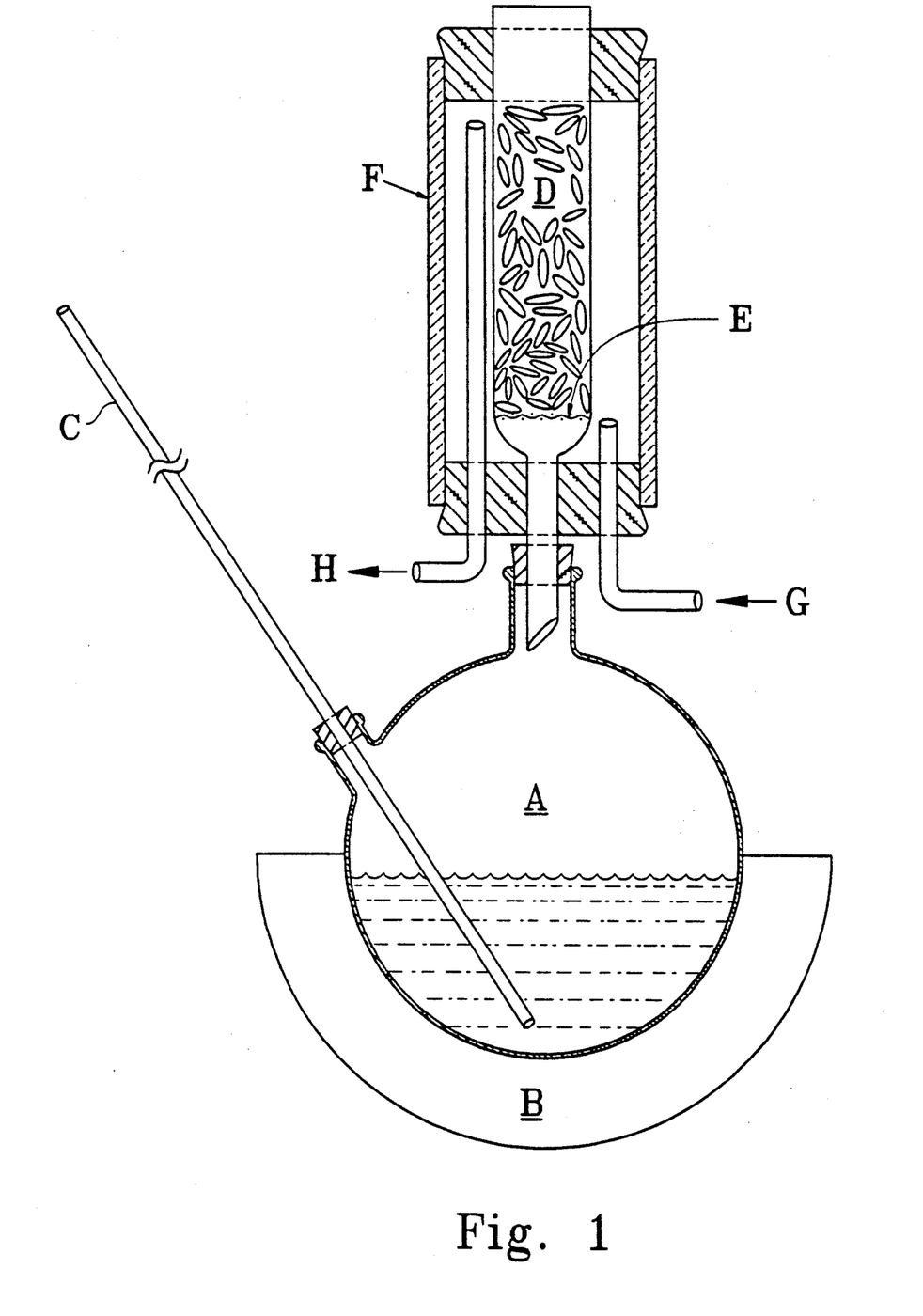
FIG. 1 is a side view of an apparatus which was employed for treating brown rice kernels with ethanol vapors. (A) 500 ml round bottom two neck glass flask; (B) heating mantle; (C) glass vent tube; (D) 3 cm×12 cm glass butt tube holding 40 g brown rice; (E) wire mesh sample retaining screen; (F) plexiglass jacket; (G) inlet; and (H) outlet for jacket water.

FIG. 1 depicts the apparatus employed for treating brown rice samples with vapors from boiling ethanol. A 40 gram (g) sample of freshly dehulled brown rice was placed in a jacketed (F), glass butt tube (3 cm dia. $\times$ 12 cm high) (D) which was fitted with a wire mesh sample retaining screen (E). Water from a water bath set at 83° C. was circulated through the jacket (F). After the temperature of the sample reached 78° C., which required 20 minutes, the glass butt (D) was inserted into the neck of a 500 ml round bottom flask (A) containing boiling aqueous ethanol (95% v/v; b.p. 78° C.). Samples were treated with ethanol (EtOH) vapors for 3, 5, and 10 minutes. Following treatment the samples were transferred to shallow stainless steel pans and allowed to cool in room temperature (24° C.) air.

Brown rice samples at 12.8% moisture (moisture level of control) and 8.0% moisture were treated with EtOH vapors. Samples at 8.0% moisture were obtained by drying the 12.8% moisture brown rice for 2.5 hours at 65° C. Untreated brown rice kernels and flours prepared from them served as controls. Brown rice kernels were placed in a 83° C. jacketed, glass butt tube for 30 minutes to allow the effect of heat on kernel stability to be evaluated. To compare the action of aqueous EtOH with that of the common, commercial vegetable oil extractive solvent hexane, brown rice kernels were treated with vapors from boiling hexane (b.p. 68° C.).

Brown rice flours were prepared by grinding vapor-treated kernels to a powder in a Udy Cyclone Mill (Udy, Corp., Fort Collins, Colo.) using a 20 mesh sieve screen. Brown rice kernel and flour samples were stored in half pint-size capped glass jars with air headspace at 36° C. Two batches of vapor-treated and control kernel and flour samples were subjected to analytical tests to determine thiamine content, bacterial and mold populations, and storage stabilities.

As a measure of the extent of lipolytic hydrolysis of brown rice kernel and flour lipids during storage, the free fatty acids contents of vapor-treated and control rice samples were determined the day following vapor treatment and then periodically by a micro method, Hoffpauir et al, 1947, "Germination and free fatty acids . . . ", Science 106:344–345. Meta-cresol purple was substituted for the phenolphthalein indicator. Free fatty acids content was calculated as oleic acid and expressed as percent of oil.

As a measure of oxidative deterioration of unsaturated lipids in brown rice kernels and flours during storage, conjugated diene hydroperoxides CDHP content was determined by the method of St. Angelo et al, 1972, "A comparison of minor constituents in peanut butter as possible sources . . . ", J. Am. Peanut Res. and Educ. Assoc. 4:186–197. Samples were ground in a Udy cyclone mill (Udy Corp., Boulder, Colo.) to pass through a 20-mesh screen. One-half gram samples were shaken with 25 ml high performance liquid chromatography grade hexane for 30 minutes and then filtered through 0.45 μm Millex-HV Millipore filters. Absorbancies of the filtrates at 234.0 nm were determined, using hexane as a reference. An absorptivity coefficient $(A_s)$ of 24,500 mol liter$^{-1}$ cm$^{-1}$ was used to calculate the concentration of CDHP in micromoles per gram brown rice (dry basis).

For microbiological assays, 10 g samples of rice were weighed, transferred aseptically into sterile blender jars and blended with 90 ml of sterile pH 7.2 phosphate-buffered distilled water. Serial dilutions of $10^{-1}$, $10^{-2}$, and $10^{-3}$ were prepared using sterile pH 7.2 phosphate-buffered distilled water. Duplicate nutrient agar pour plates for total plate counts and triplicate potato dextrose agar plates for total molds were inoculated with the appropriate dilutions and incubated as described by DeLucca et al, 1978, "Isolation and identification of lipolytic microorganisms found on rough rice from two growing areas", J. Food Protection 41:28–30.

Thiamine contents of vapor-treated and control rice samples were determined in duplicate by the Association of Official Analytical Chemists, 1985, Official Methods of Analysis, 14th ed., The Association, Arlington, Va.

Figure 2:
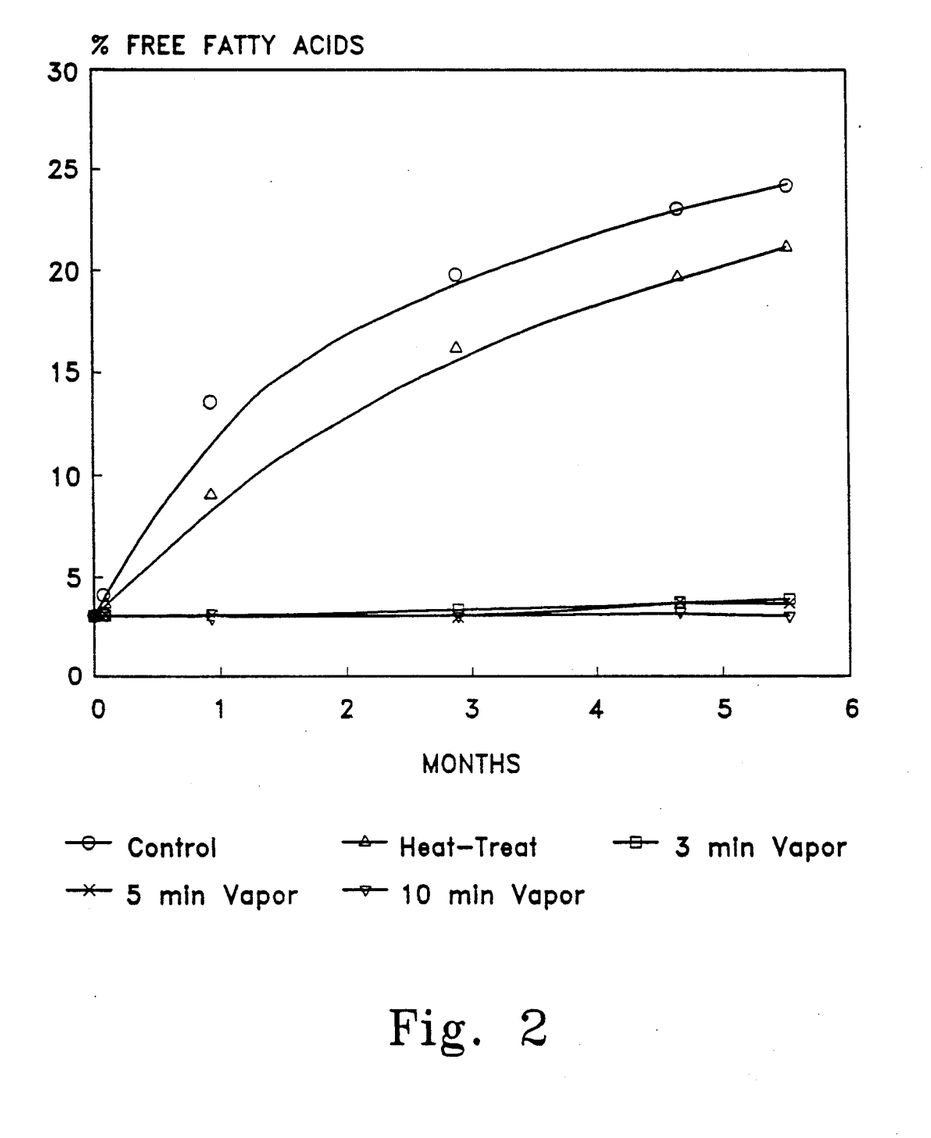
FIG. 2 is a graph of % free fatty acids by weight of lipid in brown rice kernels treated with vapors from boiling aqueous ethanol for 3, 5, and 10 minutes, control kernels, and heat-treated kernels versus months stored at 36° C.

Free fatty acids (FFA) were determined periodically during storage as a measure of the extent of lipolytic hydrolysis of lipids in brown rice kernel and flour samples. FIG. 2 shows the effect of storage time at 36° C. on the accumulation of FFA in brown rice kernels (12.8% moisture) which were treated with vapors from boiling aqueous EtOH, heat-treated, or untreated (control). Samples were stored at 36° C. to accelerate the rate of lipolytic hydrolysis. FFA levels in brown rice kernels treated with EtOH vapors for 3 or 5 minutes increased from 3.0% to 3.9% and 3.6%, respectively, after 6 months of storage at 36° C. There was no change in FFA content in kernels treated with vapors for 10 minutes, while that of control kernels increased from 3% to 24%. During storage the increase in FFA in heat-treated kernels was approximately 15% lower than that of the control kernels, indicating some deactivation of lipase by heat-denaturation.

The vapors from boiling aqueous EtOH extracted surface water from the kernels and condensed on the kernels during treatment. The vapor treatment lowered the moisture content of the brown rice kernels approximately 1.5%; loss of kernel oil was less than 3%. To determine whether the action of the EtOH vapors in stabilizing brown rice kernels to FFA formation depended on the vapors condensing on the kernels, brown rice kernels at 8.0% moisture were treated with EtOH vapors. The EtOH vapors did not condense on the 8% moisture kernels; the water content of the kernels did not change and no oil or other bran components were extracted. FFA levels did not increase in the 10 minute vapor-treated 8% moisture kernels following storage at 36° C. Thus, vapors from boiling aqueous EtOH were effective in stabilizing the kernels to FFA formation. Stabilization was not dependent on the vapors condensing into a liquid.

Figure 3:
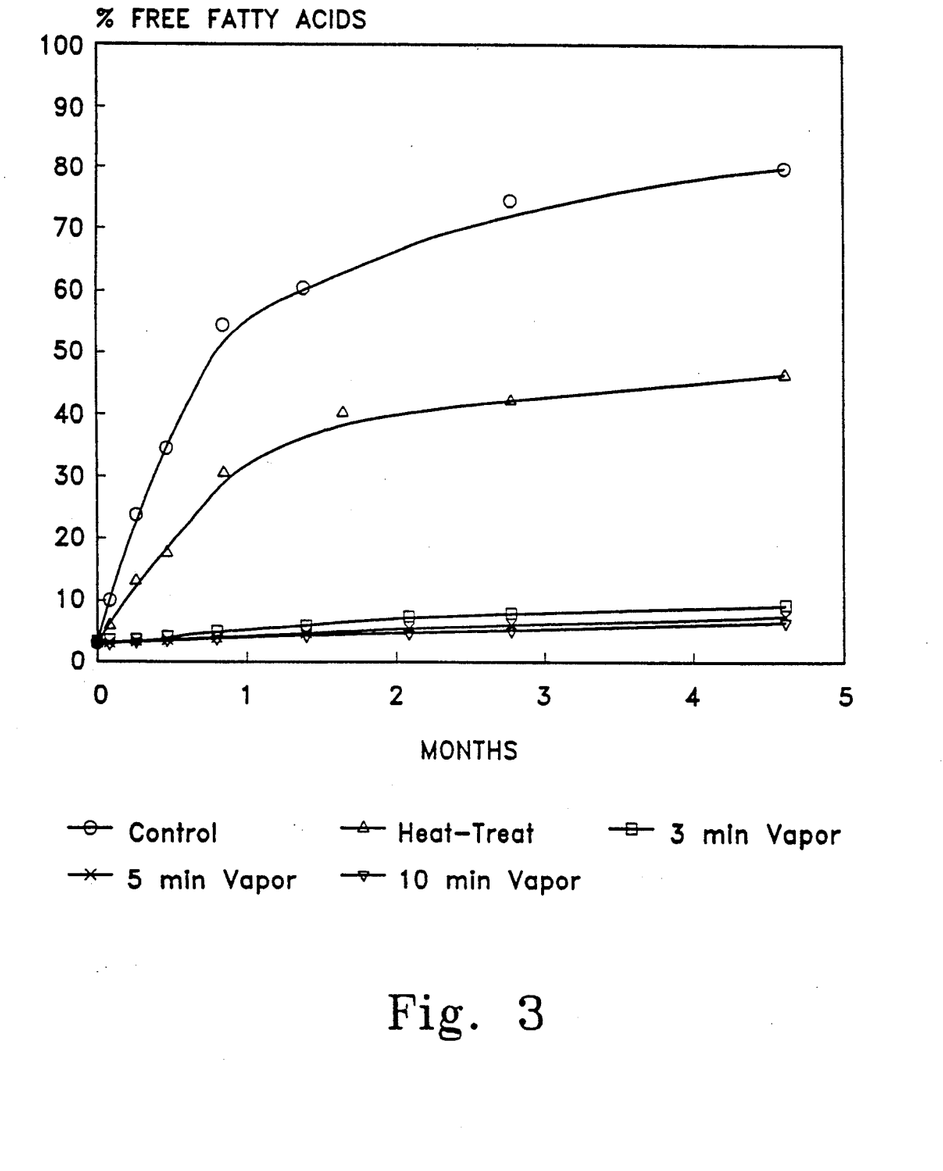
FIG. 3 is a graph of % free fatty acids by weight of lipid in flours prepared from brown rice kernels treated with vapors from boiling aqueous ethanol for 3, 5, and 10 minutes, control kernels, and heat-treated kernels versus months stored at 36° C.

FIG. 3 shows the effect of storage time at 36° C. on FFA levels in flours prepared from 12.8% moisture brown rice kernels treated with EtOH vapors. Following 5 months of storage, FFA levels in flours prepared from kernels treated with vapors for 3, 5, and 10 minutes increased from 3% to 9%, 7%, and 6%, respectively. In contrast, the FFA levels in flours prepared from control and heat-treated kernels increased from 3% to 80% and 46%, respectively. The low increases in FFA in the flours prepared from 3, 5, and 10 minutes vapor-treated kernels indicated a low level of residual lipase activity in the flours.

Vapors from boiling hexane were ineffective in preventing FFA formation in brown rice kernels. Following one month storage at 36° C., the FFA level in kernels treated with hexane vapors for 3, 5, and 10 minutes increased from 3% to 18%, 17%, and 12%, respectively; the FFA levels in control kernel and heat-treated kernels increased to 17% and 14%, respectively.

Figure 4:
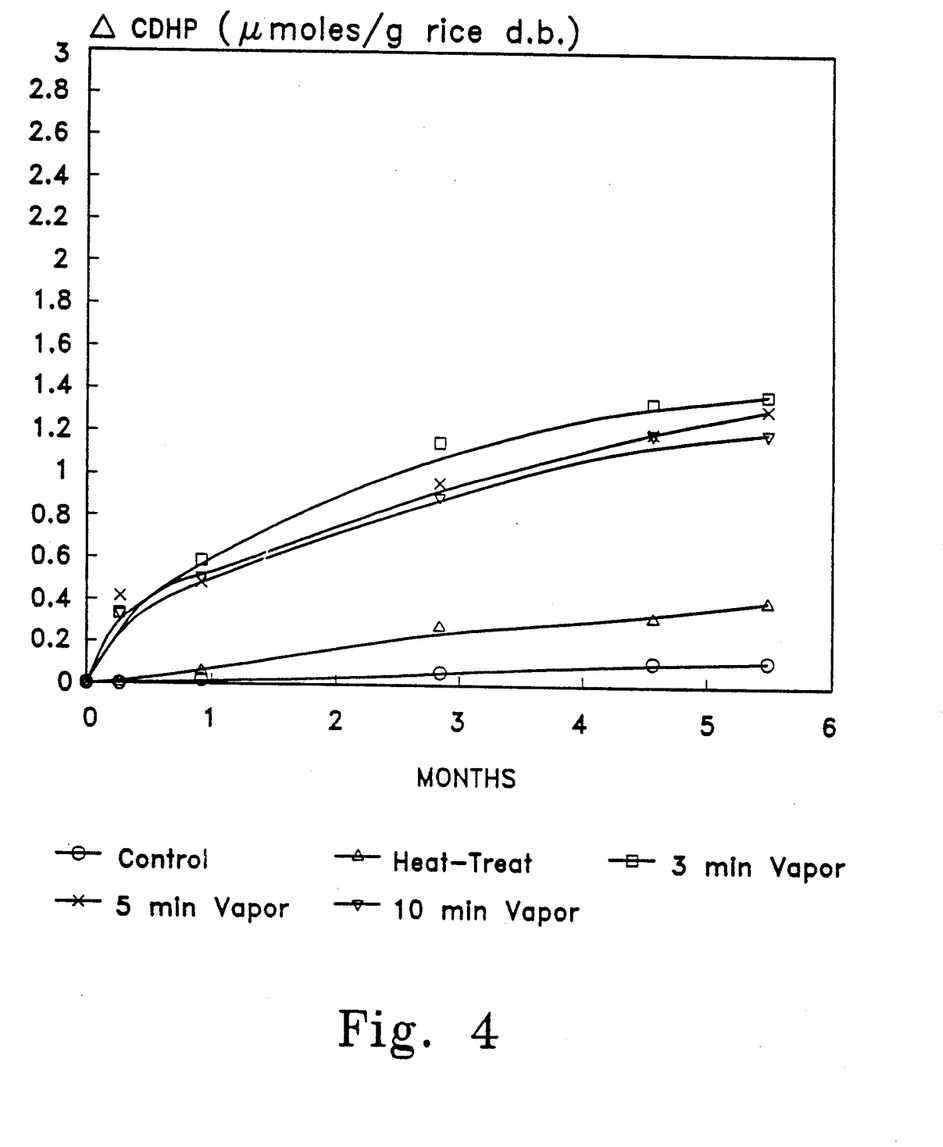
FIG. 4 is a graph of change in conjugated diene hydroperoxides content Δ CDHP (micromoles per gram of rice, dry basis) in brown rice kernels treated with vapors from boiling aqueous ethanol for 3, 5, and 10 minutes, control kernels, and heat-treated kernels versus months stored at 36° C.
Figure 5:
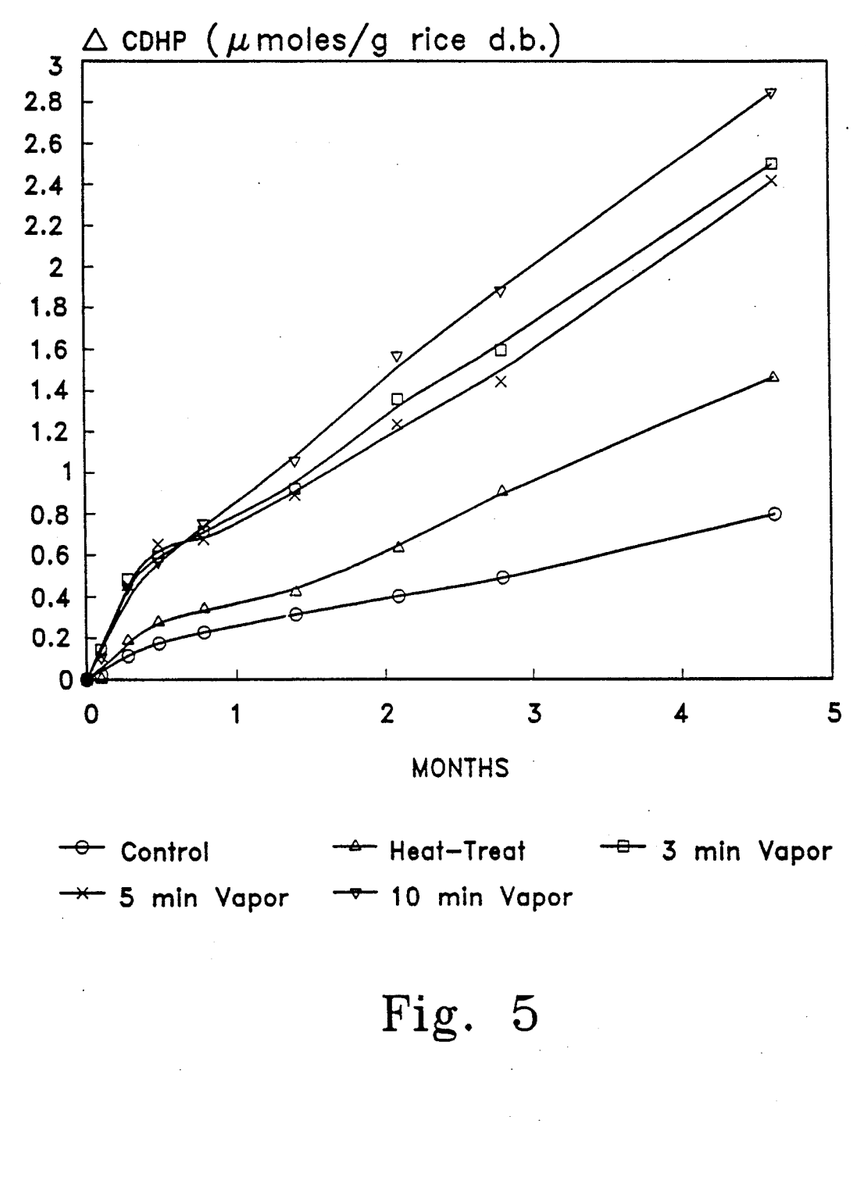
FIG. 5 is a graph of change in conjugated diene hydroperoxides content Δ CDHP (micromoles per gram of rice, dry basis) in flours prepared from brown rice kernels treated with vapors from boiling aqueous ethanol for 3, 5, and 10 minutes, control kernels, and heat-treated kernels versus months stored at 36° C.

Conjugated diene hydroperoxide (CDHP) contents were determined periodically during storage as a measure of the extent of oxidative deterioration of unsaturated lipids in brown rice kernel and flour samples. FIGS. 4 and 5 depict the effects of storage at 36° C. on the development of CDHP in brown rice kernels treated with EtOH vapors and flours prepared from these kernels, respectively. CDHP levels increased rapidly in the kernels treated with EtOH vapors and in their flours. Only a slight increase in CDHP level was observed for control and heat-treated kernels during storage. The higher rate of increase in CDHP in the EtOH vapor-treated kernels and their flours compared to the control kernels and flour, indicates an increased susceptibility of the lipids in the former to oxidative rancidity.

Table I shows the effect of EtOH vapor treatment on the bacterial and mold populations of brown rice kernels. Total plate counts and mold counts were very low in the EtOH vapor-treated kernels. The vapors from boiling aqueous EtOH denatured the organisms and thus killed them.

TABLE I

Effect of EtOH vapor treatment on microbial population of brown rice. Counts were determined one week after dehulling kernels. Initial moisture content 12.8%.

| TREATMENT | TOTAL PLATE COUNT (No./g) | MOLD COUNT (No./g) |
| --- | --- | --- |
| Control | 14,000 | 10 |
| Heat-Treated | 250 | <10 |
| 3 minutes EtOH Vapors | 10 | <10 |
| 5 minutes EtOH Vapors | 10 | <10 |
| 10 minutes EtOH Vapors | <10 | <10 |

Brown rice is rich in the B vitamins. Thiamine was chosen as an indicator of the degree of retention of the B vitamins in kernels treated with EtOH vapors. As shown in Table II, there was no loss of thiamine in the EtOH vapor-treated kernels.

TABLE II

Effect of EtOH vapor treatment on thiamine content of brown rice.

| TREATMENT | THIAMINE (mg/100 g) |
| --- | --- |
| 12.8% MOISTURE BROWN RICE | |
| Control | 0.72 |
| Heat-Treated | 0.74 |
| 3 minutes EtOH Vapors | 0.72 |
| 5 minutes EtOH Vapors | 0.72 |
| 10 minutes EtOH Vapors | 0.73 |
| 8.0% MOISTURE BROWN RICE | |
| Control | 0.72 |
| Heat-Treated | 0.71 |
| 10 minutes EtOH Vapors | 0.71 |

An economically feasible, stable, full fat, product with ungelatinized starch can be produced by treating brown rice with the vapors from boiling aqueous EtOH. Brown rice kernels stabilized by EtOH vapor treatment are stable to lipolytic hydrolysis, as indicated by no or minimal increases in FFA during storage. EtOH vapors act by denaturing lipases endogenous to the brown rice kernel with concomitant deactivation. The longer the treatment time, the more effective the EtOH vapors were in denaturing the endogenous lipases. Flours produced from kernels treated with EtOH vapors for 3-10 minutes had low residual lipase activities. Since endogenous lipases are so close to the kernel surface, denaturation by ethanol vapors is plausible. The action of EtOH vapors can also be attributed to ethanolic denaturation of bacteria and mold found on the kernel surfaces, which kills the organisms. DeLucca et al., 1978, Supra, determined that approximately 10% of the total bacterial population on rough rice and all of the isolated molds showed lipolytic action. Microbial and mold lipases are possibly more contributory to free fatty acid formation in brown rice than endogenous lipases (DeLucca and Ory, 1987, "Effects of microflora on the quality of stored rice", Trop. Sci. 27:205-214). Loeb and Mayne, 1952, "Effect of moisture on the microflora and formation of free fatty acids in rice bran", Cereal Chem. 29:163-175, found a relationship between moisture content of rice, microflora, and free fatty acids formation in rice bran.

Brown rice kernels stabilized to lipolytic hydrolysis by EtOH vapors were more susceptible to oxidative deterioration than untreated kernels. However, with proper packaging oxidative deterioration of brown rice can be slowed (Ory et al, 1980, "Storage quality of brown rice as affected by packaging . . . " J. Food Protection 43:929-932; Sharp and Timme, 1986, "Effects of storage time . . . " Cereal Chem. 63:247-25) and thus it should not be a deterrent to utilizing this process.

The foregoing detailed descriptions and examples are given merely for purposes of illustration. Modifications and variations may be made therein without departing from the spirit and scope of the invention.

We claim:

1. A process comprising:
   contacting unmilled or partially milled brown rice with ethanol vapor under conditions providing no substantial loss of oil from said unmilled or partially milled brown rice by said ethanol vapor in order to produce stabilized unmilled or partially milled brown rice and ethanol having rice extracts therein; and
   separating said stabilized unmilled or partially milled brown rice from said ethanol having rice extracts therein.

2. The process of claim 1 further including the step of grinding said stabilized unmilled or partially milled brown rice into flour.

3. The process of claim 1 wherein said contacting is carried out at the boiling point of said ethanol.

4. The process of claim 3 further including the step of grinding said stabilized unmilled or partially milled brown rice into flour.

5. The process of claim 3 wherein said contacting is carried out at a pressure equal to, or greater than, atmospheric pressure, and at a temperature of from about 78° C. to about 100° C.

6. The process of claim 5 further including the step of grinding said stabilized unmilled or partially milled brown rice into flour.

7. The process of claim 3 wherein said contacting is carried out at a temperature of from about 15° C. to about 100° C. and at a pressure less than atmospheric pressure.

8. The process of claim 7 further including the step of grinding said stabilized unmilled or partially milled brown rice into flour.

9. The process of claim 1 wherein said contacting is carried out with vapors of food grade ethanol consisting essentially of about 95% by volume ethanol and about 5% by volume water.

10. The process of claim 1 wherein, said unmilled or partially milled brown rice has a water content and said ethanol vapor has a water content, and further including the step of:
   prior to said step of contacting, changing said water content of said unmilled or partially milled brown rice to a water content which is essentially in equilibrium with said water content of said ethanol vapor.

11. The process of claim 1 wherein said unmilled or partially milled brown rice has a water content, and further including the steps of:
   prior to said step of contacting, measuring said water content of said unmilled or partially milled brown rice; and
   selecting and utilizing, in said step of contacting, ethanol vapor having a water content which is essentially in equilibrium with said measured water content of said unmilled or partially milled brown rice.

12. The process of claim 1 further including the step of:
prior to said step of contacting, heating said unmilled or partially milled brown rice to a temperature which is equal to or greater than the condensation temperature of said ethanol vapor.

13. The process of claim 1 wherein during said step of contacting, said unmilled or partially milled brown rice is maintained at a temperature which is equal to or greater than the condensation temperature of said ethanol.

14. The process of claim 1 wherein said step of separating includes separating said stabilized unmilled or partially milled brown rice from ethanol vapor.

15. The process of claim 14 wherein said step of separating further includes: separating said stabilized unmilled or partially milled brown rice from condensed ethanol containing said rice extracts therein.

16. The process of claim 14 wherein said step of separating includes: separating said stabilized unmilled or partially milled brown rice from said ethanol vapor; and evaporating condensed residual liquid ethanol from said stabilized unmilled or partially milled brown rice.

17. The process of claim 1 further including a step of separating said rice extracts from said ethanol selected from the group consisting of distillation, filtration, centrifugation, adsorption, ion exchange and membrane separation.

18. The process of claim 1 wherein subsequent to said step of separating, said ethanol vapor is contacted with at least one additional batch of unmilled or partially milled brown rice.

19. The process of claim 1 wherein said step of contacting provides extraction of about 5% or less of brown rice oil from said unmilled or partially milled brown rice.

20. The process of claim 1 wherein said step of contacting is carried out in an atmosphere which is saturated with said ethanol vapor.

* * * * *